United States Patent
Engstrom et al.

(10) Patent No.: US 9,869,060 B2
(45) Date of Patent: Jan. 16, 2018

(54) POLYMER AND ITS PREPARATION AND USE

(71) Applicant: KEMIRA OYJ, Helsinki (FI)

(72) Inventors: Ulf Jonas Anders Engstrom, Nödinge (SE); Per Anders Restorp, Göteborg (SE)

(73) Assignee: KEMIRA OYJ, Helsinki (FI)

( * ) Notice: Subject to any disclaimer, the term of this patent is extended or adjusted under 35 U.S.C. 154(b) by 25 days.

(21) Appl. No.: 14/646,026

(22) PCT Filed: Nov. 20, 2013

(86) PCT No.: PCT/EP2013/074241
§ 371 (c)(1),
(2) Date: May 20, 2015

(87) PCT Pub. No.: WO2014/079857
PCT Pub. Date: May 30, 2014

(65) Prior Publication Data
US 2015/0345079 A1    Dec. 3, 2015

Related U.S. Application Data

(60) Provisional application No. 61/729,745, filed on Nov. 26, 2012.

(30) Foreign Application Priority Data

Nov. 22, 2012 (EP) ..................... 12193726

(51) Int. Cl.
| | | |
|---|---|---|
| *D21H 17/37* | (2006.01) | |
| *C08F 220/56* | (2006.01) | |
| *C08F 220/58* | (2006.01) | |
| *D21H 21/18* | (2006.01) | |
| *D21H 17/34* | (2006.01) | |

(52) U.S. Cl.
CPC ........... *D21H 17/37* (2013.01); *C08F 220/56* (2013.01); *C08F 220/58* (2013.01); *D21H 17/34* (2013.01); *D21H 17/375* (2013.01); *D21H 21/18* (2013.01)

(58) Field of Classification Search
CPC ..... C08F 220/14; C08F 220/56; D21H 17/34; D21H 17/37; D21H 17/375
See application file for complete search history.

(56) References Cited

U.S. PATENT DOCUMENTS

| | | |
|---|---|---|
| 3,639,208 A | 2/1972 | Varveri et al. |
| 6,297,328 B1 | 10/2001 | Collins et al. |
| 2008/0035293 A1 | 2/2008 | Kemira Oyj |
| 2012/0152459 A1 | 6/2012 | Avramidis |
| 2012/0165428 A1* | 6/2012 | Tilara .................. C09D 133/06 523/400 |
| 2012/0227920 A1 | 9/2012 | Juppo et al. |
| 2012/0252972 A1 | 10/2012 | Balk et al. |

FOREIGN PATENT DOCUMENTS

| | | |
|---|---|---|
| CN | 1226260 A | 8/1999 |
| CN | 1795304 A | 6/2006 |
| CN | 102666987 A | 9/2012 |
| GB | 1235438 A | 6/1971 |
| WO | 9745468 A1 | 12/1997 |
| WO | 0056972 A1 | 9/2000 |

OTHER PUBLICATIONS

State Intellectual Property Office of People's Republic China, Search Report issued on CN201380071157.7, dated May 25, 2016.
International Search Report )PCT/EP2013/074241 ; dated Jan. 17, 2014.

* cited by examiner

*Primary Examiner* — Michael A Salvitti
(74) *Attorney, Agent, or Firm* — Berggren Inc.

(57) ABSTRACT

The present invention relates to a water-soluble cationic acrylamide-based polymer having one or more acetoacetate groups. The invention also relates to a method for producing the water-soluble polymer which comprises polymerizing ethylenically unsaturated monomers in an aqueous phase, wherein the monomers comprise (a) (meth)acrylamide, (b) ethylenically unsaturated cationic monomer, (c) ethylenically unsaturated monomer having one or more acetoacetate groups, and (d) optionally other ethylenically unsaturated monomer. The invention further relates to the use of the water-soluble polymer as a strength agent in the production of paper and board. The invention further relates to a process for producing paper and board which comprises providing an aqueous cellulosic suspension, adding to the suspension water-soluble polymer having one or more ketone groups, and dewatering the obtained suspension. The invention further relates to paper and board comprising the water-soluble polymer of the invention, as well as paper and board produced by the process of the invention.

20 Claims, No Drawings

POLYMER AND ITS PREPARATION AND USE

This application is a national application of PCT-application PCT/EP2013/074241 filed on Nov. 20, 2013, which claims priority of the European application number EP12193726.2 filed on Nov. 22, 2012 and of US provisional application number U.S. 61/729,745 filed on Nov. 26, 2012, both of which are incorporated herein by reference.

FIELD OF THE INVENTION

The present invention relates to a polymer, its preparation and use. More specifically, the present invention relates to a water-soluble polymer, its preparation and use as a strength agent in the manufacture of paper and board, a process for the production of paper and board in which a water-soluble polymer is added to an aqueous cellulosic suspension to be dewatered, as well as paper and board containing the polymer.

BACKGROUND OF THE INVENTION

Strength is important to cellulosic products like paper and board, and increasing the strength of such products provides several benefits. For instance, increasing the strength of paper makes it possible to increase filler loadings and reduce virgin fibre usage, thereby reducing raw material costs in paper making processes. Similarly, increasing the strength of board makes it possible to reduce the grammage while maintaining the strength properties of cellulosic products made from the board, which also leads to savings in virgin fibre usage and reduced transportation costs, thus environmental and economic benefits.

In the manufacture of paper and board, increased dry strength can be accomplished by addition to the aqueous cellulosic suspension of a natural or synthetic polymer, optionally in combination with co-additives. Examples of such dry strength polymers include starches, carboxymethyl celluloses, cationic polyamines and cationic polyacrylamides. However, it would be desirable to be able to provide paper and board with improved dry strength.

Accordingly, there is still a need of additives which impart higher strength to paper and board and provide improvements in the manufacture of paper and board. There is also a need of additives which show an improved dry strength effect and storage stability.

SUMMARY OF THE INVENTION

It is an object of the present invention to provide a polymer which imparts high strength properties to paper and board, in particular improved dry strength, and which accordingly can be used as a dry strength agent in the production of paper and board. It is another object of the present invention to provide a papermaking process which provides paper and board with improved strength properties, in particular improved dry strength. It is a further object of the invention to provide a method for producing a polymer with the above-mentioned advantageous characteristics.

The present invention makes it possible to produce paper and board with improved strength properties, in particular improved dry strength, burst strength and compression strength, also by means of paper and board making processes which comprises the use of cellulosic suspensions having high contents of salts and colloidal substances, high conductivity and high degree of white water closure, i.e. extensive white water recycling and limited fresh water supply. The present invention makes it possible to use lower dosages of strength agent to produce in-specification paper and board with high strength, thereby leading to an improved papermaking process and economic benefits.

Accordingly, in one aspect, the present invention relates to a water-soluble cationic acrylamide-based polymer having one or more acetoacetate groups.

In another aspect, the present invention relates to a method for preparing the water-soluble cationic polymer according to the invention which comprises polymerizing ethylenically unsaturated monomers in an aqueous phase, wherein the monomers comprise:
 (a) (meth)acrylamide,
 (b) ethylenically unsaturated cationic monomer,
 (c) ethylenically unsaturated monomer having one or more acetoacetate groups, and
 (d) optionally other ethylenically unsaturated monomer.

In another aspect, the present invention relates to a water-soluble cationic acrylamide-based polymer obtainable by the method according to the invention.

In another aspect, the present invention relates to the use of the water-soluble cationic acrylamide-based polymer according to the invention as a strength agent in the production of paper and board.

In another aspect, the present invention relates to a process for producing paper and board which comprises:
 (i) providing an aqueous cellulosic suspension,
 (j) adding to the suspension a water-soluble polymer having one or more ketone groups, and
 (ii) dewatering the obtained suspension.

In another aspect, the present invention relates to paper and board comprising the water-soluble cationic polymer according to the invention, as well as paper and board produced by the process according to the invention.

These and other objects, aspects and advantages of the invention will be described in further detail hereinafter.

DETAILED DESCRIPTION OF THE INVENTION

The present invention provides a water-soluble polymer which imparts high dry strength to paper and board. The present invention further provides water-soluble cationic acrylamide-based polymer having one or more acetoacetate groups. The water-soluble cationic acrylamide-based polymer further contains one or more cationic groups and may also contain one or more anionic group as long as the overall charge of the polymer is cationic. The present invention further provides a process for producing paper and board which comprises adding to an aqueous cellulosic suspension a water-soluble polymer having one or more ketone groups, suitably the water-soluble cationic acrylamide-based polymer having one or more acetoacetate groups according to the invention.

According to the invention, the water-soluble polymer can be obtained by polymerizing ethylenically unsaturated monomers, preferably in an aqueous phase, wherein the monomers comprise (meth)acrylamide, ethylenically unsaturated monomer having one or more ketone groups, preferably ethylenically unsaturated monomer having one or more acetoacetate groups, and optionally other ethylenically unsaturated monomer, suitably the monomers comprise ethylenically unsaturated anionic monomer, cationic monomer or mixture thereof, most preferably ethylenically unsaturated cationic monomer.

The water-soluble polymer of the invention may have one or more ketone groups present in the polymer chain, i.e. in the polymer backbone, in a side-chain extending from the polymer, i.e. pendant groups extending from the polymer backbone, or both. Suitably, the water-soluble polymer has a side-chain containing one or more ketone groups, preferably acetoacetate groups, preferably pendant acetoacetate groups.

The terms "ethylenically unsaturated monomer" and "monomer", as used herein, means a polymerizable allylic, vinylic or acrylic compound, or a compound having one or more ethylenically unsaturated bonds, which is polymerizable by a radical mechanism, or radically polymerizable. The term "acrylamide-based polymer", as used herein, means poly(meth)acrylamide, i.e. polyacrylamide or polymethacrylamide, preferably polyacrylamide, or a polymer prepared from monomers comprising (meth)acrylamide, i.e. acrylamide, methacrylamide or a mixture thereof, preferably acrylamide, optionally in combination with one or more other monomers.

According to the invention, the monomers used to prepare the water-soluble polymer comprise (meth)acrylamide, i.e. acrylamide, methacrylamide or a mixture thereof, preferably acrylamide. The monomers may also comprise, and preferably comprise, ethylenically unsaturated anionic monomer, ethylenically unsaturated cationic monomer or a mixture thereof. Preferably, the monomers comprise an ethylenically unsaturated cationic monomer.

Examples of suitable ethylenically unsaturated anionic monomers include ethylenically unsaturated carboxylic acids and salts thereof, e.g. acrylic acid and its salts, including sodium acrylate and ammonium acrylate, methacrylic acid and its salts, including sodium methacrylate and ammonium methacrylate, fumaric acid, maleic acid, itaconic acid and acrylamidomethylbutanoic acid and their salts, including the sodium and ammonium salts,
ethylenically unsaturated sulphonic acids and salts thereof, e.g. 2-acrylamido-2-methylpropanesulfonic acid (AMPS), the sodium salt of AMPS, sodium vinyl sulfonate, styrene sulfonate, allyl sulfonate, sodium vinyl sulfonate, vinylsulfonic acid and salts thereof, ethylenically unsaturated phosphonic acids and salts thereof, e.g. vinylphosphonic acid, allylphosphonic acid, sulfomethylated acrylamide, and phosphonomethylated acrylamide.

Examples of suitable ethylenically unsaturated cationic monomers include cationic (meth)acrylamides and cationic (meth)acrylates, e.g. acid addition salts and quaternary ammonium salts of the dialkylaminoalkyl (meth)acrylamides and dialkylaminoalkyl (meth)acrylates in which the alkyl groups are generally C1 to C4 alkyls, usually prepared using acids like HCl, $H_2SO_4$, etc., or quaternizing agents like methyl chloride, dimethyl sulphate, benzyl chloride, etc., such as, for example, dimethylaminoethyl acrylate methyl chloride quaternary salt (DMAEA-MCQ) or acryloxyethyl trimethylammonium chloride, dimethylaminoethyl acrylate methyl sulfate quaternary salt (DMAEA-MSQ), dimethyl-aminoethyl acrylate benzyl chloride quaternary salt (DMAEA-BCQ), dimethylaminoethyl acrylate sulfuric acid salt, dimethylaminoethyl acrylate hydrochloric acid salt, dimethylaminoethyl methacrylate methyl chloride quaternary salt (DMAEMA-MCQ), dimethylaminoethyl methacrylate methyl sulfate quaternary salt (DMAEMA-MSQ), dimethylaminoethyl methacrylate benzyl chloride quaternary salt (DMAEMA-BCQ), dimethylaminoethyl methacrylate sulfuric acid salt, dimethylaminoethyl methacrylate hydrochloric acid salt, acrylamidopropyltrimethylammonium chloride, dimethylaminopropyl acrylamide methyl chloride quaternary salt, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diallyldiethylammonium chloride (DADEAC) and diallyldimethylammonium chloride (DADMAC), preferably the methyl chloride, methyl sulfate and benzyl chloride quaternary salts defined above. Examples of preferred ethylenically unsaturated cationic monomers include cationic (meth)acrylamides, cationic (meth)acrylates, and mixtures thereof.

According to the invention, the monomers used to prepare the water-soluble polymer further comprise an ethylenically unsaturated monomer containing one or more ketone groups, i.e. ketone functional monomer, or a compound or ethylenically unsaturated monomer having one or more ketone groups in addition to an allylic, vinylic or acrylic group, suitably vinylic or acrylic group, preferably acrylic group. Examples of suitable ethylenically unsaturated monomers containing one or more ketone groups include ethylenically unsaturated monomers having one or more acetoacetate groups, (meth)acrylamides and (meth)acrylates having one or more ketone groups, (meth)acrylamides and (meth)acrylates having one or more acetoacetate groups, suitably ethylenically unsaturated monomers having one or more acetoacetate groups, preferably (meth)acrylates having one or more acetoacetate groups. Examples of ethylenically unsaturated monomers containing one or more ketone groups include diacetone acrylamide (DAAM) or N-(1,1-Dimethyl-3-oxobutyl)-acrylamide (CAS No. 2873-97-4), and methyl vinylketone. Examples of ethylenically unsaturated acrylic monomers having one or more acetoacetate groups include 2-(acryloyloxy)ethyl acetoacetate. Examples of (meth)acrylates having one or more acetoacetate groups include acetoacetoxyethylmethacrylate (AAEMA) or 2-(methacryloyloxy)ethyl acetoacetate.

According to the invention, the monomers used to prepare the water-soluble polymer may further comprise other ethylenically unsaturated monomers. Examples of suitable copolymerizable monomers of this type include N,N-dimethylacrylamide, N,N-diethylacrylamide, N-isopropylacrylamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, N-vinylformamide, N-vinylacetamide, ethyltriglycol (meth)acrylate and butyldiglycol (meth)acrylate, N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, polyethylene glycol dimethacrylate, N-vinyl acrylamide, N-methyl allylacrylamide, and combinations thereof.

Examples of suitable water-soluble polymers of the invention include (i) essentially linear polymers, (ii) cross-linked polymers in which the degree of cross-linking is such that the polymer is still water-soluble, i.e. the amount of cross-linker or multifunctional monomer having two or more ethylenically unsaturated bonds used in the polymerization process is low, e.g. 0.01 to 0.5 mole %, to provide a water-soluble polymer, (iii) water-soluble polymers obtained by polymerizing monomers comprising cationic monomer, (iv) water-soluble polymers obtained by polymerizing monomers comprising anionic monomer, (v) water-soluble polymers obtained by polymerizing monomers comprising both anionic and cationic monomers and having an overall anionic charge, (vi) water-soluble polymers obtained by polymerizing monomers comprising both anionic and cationic monomers and having an overall cationic charge, and (vii) combinations of the above.

According to the invention, water-soluble anionic and cationic polymers may have a charge density of from about 0.2 to about 5.0 meqv/g of dry polymer, suitably from about 0.6 to about 3.0.

According to the invention, the water-soluble polymer usually has a weight average molecular weight Mw of at least about 1,000, or at least about 10,000, or at least about 100,000, or at least about 500,000, or at least about 1,000,000, or at least about 2,000,000 Dalton. The upper limit is not critical; it can be about 30,000,000, usually 25,000,000 and suitably 20,000,000 Dalton.

According to the invention, the water-soluble polymer can be prepared from ethylenically unsaturated monomers, or a mixture of such monomers, which comprise (meth) acrylamide, ethylenically unsaturated monomer containing one or more ketone groups, preferably ethylenically unsaturated monomer containing one or more one or more acetoacetate groups, and optionally and preferably ethylenically unsaturated other monomer, suitably ethylenically unsaturated anionic and/or cationic monomer, preferably ethylenically unsaturated cationic monomer. Usually, the water-soluble polymer of this invention is prepared from ethylenically unsaturated monomer comprising from about 40 to about 99 mole % of (meth)acrylamide, from about 0.5 to about 20 mole % of ethylenically unsaturated cationic monomer, from about 0.5 to about 20 mole % of ethylenically unsaturated monomer containing one or more ketone groups, and from 0 to about 20 mole % of other ethylenically unsaturated monomer, suitably from about 70 to about 98 mole % of (meth)acrylamide, from about 1 to about 10 mole % of ethylenically unsaturated cationic monomer, from about 1 to about 10 mole % of ethylenically unsaturated monomer having one or more ketone groups, and from 0 to about 10 mole % of other ethylenically unsaturated monomer, preferably from about 75 to about 98 mole % of (meth)acrylamide, from about 1 to about 10 mole % of ethylenically unsaturated cationic monomer, from about 1 to about 10 mole % of ethylenically unsaturated monomer having one or more ketone groups, and from 0 to about 5 mole % of other ethylenically unsaturated monomer, and more preferably at least 80 mole % of (meth)acrylamide, from about 2 mole % of ethylenically unsaturated cationic monomer, from about 2 mole % of ethylenically unsaturated monomer having one or more ketone groups, wherein the ethylenically unsaturated monomer having one or more ketone groups defined herein is preferably an ethylenically unsaturated monomer having one or more acetoacetate groups. The water-soluble polymer which is anionic and which can be used in the process of the invention can be prepared as defined above, including the monomers and mole percentages, except that anionic monomer is used instead of cationic monomer.

The water-soluble polymer of this invention can be prepared by polymerization of ethylenically unsaturated monomers in known manner and the polymerization is suitably carried out in an aqueous or inverse emulsion phase (water-in-oil dispersion). Polymerization processes are generally known in the art and reference is made to Encyclopedia of Polymer Science and Engineering, Vol. 1-18, John Wiley & Sons, 1985, which is hereby incorporated herein by reference. The ethylenically unsaturated monomers used are preferably at least partly soluble in the aqueous phase. The polymerization is suitably initiated in an aqueous phase containing the ethylenically unsaturated monomers, as defined herein, one or more conventional polymerization initiators, and optional chain-transfer agent for modifying the molecular weight of the polymer, and is suitably carried out in the absence of oxygen in an inert gas atmosphere, for example under nitrogen. The polymerization suitably takes place under stirring at temperatures between about 20 and about 100° C., preferably between about 40 and about 90° C.

Examples of suitable polymerization initiator, or free-radical polymerization initiators, include azo compounds, e.g. 2,2'-azobis(2-amidinopropane)dihydrochloride, 2,2'-azobis[2-(2-imidazolin-2-yl)propane]dihydrochloride, 2,2'-azobis(isobutyronitrile) (AIBN) and 2,2'-azobis(2,4-dimethylvaleronitrile) (AIVN), di methyl 2,2'-azobisisobutyrate and 2,2'-azobis-(4-methoxy-2,4-dimethylvaleronitrile), redox systems, e.g. ammonium persulfate/ferric sulfate, sodium bisulfite (sodium hydrogen sulfite), potassium persulfate, ammonium persulfate, dibenzoyl peroxide, dilauryl peroxide and tert-butyl peroxide, wherein the initiators may be used either individually or in combinations and generally in an amount of about 0.005 to 3% by weight of the total weight of the monomers. Chain transfer agent means any molecule, used in free-radical polymerization, which will react with a polymer radical forming a dead polymer and a new radical. In particular, adding a chain transfer agent to monomers in a polymerization process results in a chain-breaking and a concomitant decrease in the size of the polymerizing chain. Thus, adding a chain transfer agent limits the molecular weight of the polymer being prepared. Examples of suitable chain-transfer agents include alcohols, e.g. methanol, ethanol, 1-propanol, 2-propanol, butyl alcohol and glycerol, sulfur compounds, e.g. alkylthiols, thioureas, sulfites and disulfides, carboxylic acids, e.g. formic and malic acid, and their salts, e.g. sodium formate, phosphites, e.g. sodium hypophosphite, and combinations thereof. The amount of chain-transfer agent used in the polymerization process is generally between from about 1 to about 30,000 ppm, suitably from about 25 to about 10,000 ppm, based on monomer.

According to the invention, the water-soluble polymer may be in any state of aggregation such as, for example, in solid form, e.g. powders, in liquid form, e.g. solutions, emulsions, dispersions, including salt dispersions, i.e. a dispersion of fine particles of water-soluble polymer in an aqueous salt solution which is prepared by polymerizing ethylenically unsaturated monomers with stirring in an aqueous salt solution in which the resulting water-soluble polymer is insoluble. When added to an aqueous cellulosic suspension in the production of paper or board, the water-soluble polymer is suitably in liquid form, e.g. in the form of an aqueous solution or dispersion.

The present invention further comprises the use of the water-soluble polymer, as defined herein, as an additive in the production of paper and board, suitably as a strength agent and preferably as a dry strength agent, to provide paper and board with improved strength, preferably improved dry strength.

The present invention further relates to a process for the production of paper and board which comprises adding a water-soluble polymer, as defined herein, to an aqueous cellulosic suspension, which process provides paper and board with improved strength, preferably improved dry strength.

The water-soluble polymer is added to the aqueous cellulosic suspension in an amount which is usually at least about 0.001, often at least about 0.005% by weight, based on dry weight of the suspension, and the upper limit is usually about 3 and suitably about 1.5% by weight, based on dry weight of the suspension.

Further additives may also be employed in the use and the process of the invention. Examples of suitable further additives include one or more drainage and retention aids, cationic coagulants, wet strength agents, e.g. polyamine-epichlorohydrin and polyamidoamine-epichlorohydrin based resins, optical brightening agents, dyes, sizing agents, e.g. rosin-based sizing agents, styrene acrylates and cellulose-reactive sizing agents, e.g. alkyl and alkenyl ketene dimers and multimers, and alkenyl succinic anhydrides, etc.

The further additives preferably comprise one or more drainage and retention aids. The expression "drainage and retention aid", as used herein, refers to one or more additives which, when added to an aqueous cellulosic suspension, give better drainage and/or retention than is obtained when not using said one or more additives. The one or more drainage and retention aids may comprise anionic polymers, cationic polymers, siliceous materials and combinations thereof, preferably at least one cationic polymer. The anionic polymers and cationic polymers of drainage and retention aids usually have a weight average molecular weight Mw of at least about 1,000,000 Dalton. Examples of suitable anionic polymers include anionic polyacrylamides other than the water-soluble cationic polymer of the invention. Examples of suitable cationic polymers include cationic polysaccharides, e.g. cationic starches, and cationic synthetic polymers, e.g. cationic polyacrylamides, preferably cationic polyacrylamides other than the water-soluble cationic polymer of the invention, poly(diallyldimethylammonium chlorides), cationic polyethylene imines, cationic polyamines and cationic polyamidoamines.

Examples of suitable siliceous materials include anionic silica-based particles and anionic clays of the smectite type, e.g. bentonite. Preferably, the siliceous material has particles in the colloidal range of particle size. Anionic silica-based particles, i.e. particles based on $SiO_2$ or silicic acid, are preferably used and such particles are usually supplied in the form of aqueous colloidal dispersions, so-called sols. Examples of suitable silica-based particles include colloidal silica and different types of polysilicic acid, either homopolymerized or co-polymerized, for example polymeric silicic acid, polysilicic acid microgel, polysilicate and polysilicate microgel. The silica-based sols can be modified and contain other elements, e.g. aluminum, boron, magnesium, nitrogen, zirconium, gallium, titanium and the like, which can be present in the aqueous phase and/or in the silica-based particles.

Examples of preferred drainage and retention aids include cationic starches, cationic polyacrylamides, anionic polyacrylamides, anionic siliceous materials and combinations thereof. Examples of suitable combinations of drainage and retention aids comprise (i) cationic starch and anionic siliceous material, preferably silica-based particles, (ii) cationic polyacrylamide and anionic siliceous material, preferably silica-based particles, (iii) cationic starch, cationic polyacrylamide and anionic siliceous material, preferably silica-based particles, (iv) cationic polyacrylamide, anionic polyacrylamide and anionic siliceous material, preferably silica-based particles, and (v) cationic starch, anionic polyacrylamide and anionic siliceous material, preferably silica-based particles.

The one or more drainage and retention aids can be added to the aqueous cellulosic suspension in amounts which can vary within wide limits depending on, inter alia, type and number of additives, type of suspension, point of addition, etc. When used, the anionic polymers are usually added in an amount of at least about 0.001, often at least about 0.005% by weight, based on dry weight of the suspension, and the upper limit is usually about 3 and suitably about 1.5% by weight. When used, the cationic polymers are usually added in an amount of at least about 0.001, often at least about 0.005% by weight, based on dry weight of the suspension, and the upper limit is usually about 3 and suitably about 1.5% by weight. When used, the siliceous materials are usually added in an amount of at least about 0.001, often at least about 0.005% by weight, based on dry weight of the suspension, and the upper limit is usually about 1.0 and suitably about 0.6% by weight.

Examples of suitable coagulants include organic and inorganic coagulants. Examples of suitable organic coagulants include low molecular weight cationic polymers, e.g. homo and copolymers of diallyl dimethyl ammonium chloride (DADMAC), polyamines, polyamideamines, polyethylene imines, and dicyandiamide condensation polymers having a weight average molecular weight Mw in the range of from about 1,000 to about 700,000, suitably from about 10,000 to about 500,000 Dalton. Examples of suitable inorganic coagulants include aluminium compounds, e.g. alum and polyaluminium compounds, e.g. polyaluminium chlorides, polyaluminium sulphates, polyaluminium silicate sulphates and mixtures thereof.

When used, the coagulant is preferably added prior to adding the one or more drainage and retention aids. The cationic coagulant can be added in an amount of at least about 0.001, or from about 0.05, usually from about 0.1, up to about 3.0, usually up to about 2.0% by weight, calculated as dry coagulant on dry suspension, When used, each of the wet strength agent and sizing agent, as defined above, can be added to the suspension in an amount of from about 0.01 to about 1, usually from about 0.1 to about 0.5% by weight, calculated as dry agent on dry suspension.

The process of the invention may comprise the use of mineral fillers of conventional types, e.g. kaolin, china clay, titanium dioxide, gypsum, talc and natural and synthetic calcium carbonates, e.g. chalk, ground marble and precipitated calcium carbonate.

The process of this invention is applicable to all processes for making paper and board, and all cellulosic suspensions, and it is particularly useful in the manufacture of paper and board from aqueous cellulosic suspensions having a high conductivity. In such cases, the conductivity of the cellulosic suspension that is dewatered on the wire is usually at least 2.0 mS/cm, suitably at least 3.5 mS/cm, and preferably at least 5.0 mS/cm. Conductivity can be measured by standard equipment such as, for example, a WTW LF 539 instrument supplied by Christian Berner. High conductivity levels mean high contents of salts, or electrolytes, which can be derived from the materials used to form the cellulosic suspension, from various additives introduced into the cellulosic suspension, from the fresh water supplied to the process, etc. Further, the content of salts is usually higher in processes where white water is extensively re-circulated, which may lead to considerable accumulation of salts in the water circulating in the process.

The present invention further encompasses a process for the production of paper and board in which white water is extensively recycled, or re-circulated, i.e. with a high degree of white water closure, for example where from 0 to about 30 tons of fresh water are used per ton of dry paper or board produced, usually less than about 20, suitably less than about 15, preferably less than about 10 and notably less than about 5 tons of fresh water per ton of paper or board. Recycling of white water obtained in the process suitably comprises mixing the white water with cellulosic fibers and/or optional filler to form a suspension to be dewatered; preferably it comprises mixing the white water with a suspension containing cellulosic fibers, and optional fillers, before the suspension enters the forming wire for dewatering. The white water can be mixed with the suspension before, between, simultaneously with or after introducing the drainage and retention aids of this invention. Fresh water can be introduced in the process at any stage; for example, it can be mixed with cellulosic fibers in order to form a suspension, and it can be mixed with a thick suspension containing cellulosic fibers to dilute it so as to form a thin suspension to be dewatered, before, simultaneously with or after mixing the suspension with white water.

The process can be used in the production of paper and board from different types of aqueous suspensions of cellulosic fibers and the suspensions should suitably contain at least about 25% by weight and preferably at least about 50% by weight of such fibers, based on dry substance. The suspension can be based on fibers from chemical pulp such as sulphate, sulphite and organosolv pulps, mechanical pulp such as thermo-mechanical pulp, chemo-thermomechanical pulp, refiner pulp and groundwood pulp, from both hardwood and softwood, and can also be based on recycled fibers, optionally from de-inked pulps, and mixtures thereof.

Paper and board according to the invention can be of many types or grades and can be used in numerous applications. Examples of grades and applications of paper include writing and printing paper grades. Examples of suitable grades and applications of board include solid board, e.g. solid bleached sulphate board (SBS) and solid unbleached sulphate board (SUS), paper board, carton board, e.g. folding boxboard (FBB), folding carton board, liquid packaging board (LPB), including all types of aseptic, non-aseptic autoclavable packaging boards, white lined chipboard (WLC), unbleached kraftboard, grey chipboard and recycled board, liner board and container board, including white sulphate kraftliner, fully bleached kraftliner, testliner, white sulphate testliner, unbleached kraftliner, unbleached testliner and recycled liner, fluting and corrugated fluting.

EXAMPLES

The invention is further illustrated in the following examples which, however, are not intended to limit the same. Parts and % relate to parts by weight and % by weight, respectively, and all suspensions are aqueous, unless otherwise stated.

Example 1

This Example describes the general polymerization procedure used to prepare polymers according to the invention and polymers used for comparison: Monomers were weighed (amounts shown in Table 1) into an Erlenmeyer flask together with sodium formate (2.5 g, except otherwise indicated below), adipic acid (2.5 g) and water (405 g). The obtained monomer mixture was transferred to a reactor equipped with a propeller stirrer, reflux condenser, thermometer, and nitrogen inlet. The monomer mixture was then purged with nitrogen and heated to 45° C. under stirring for 30 minutes. The polymerization was initiated by adding 2,2'-azobis[2-(2-imidazolin-2-yl)propane]dihydrochloride (1.4 g in 5 ml of water). The polymerization was allowed to continue at 45° C. for one hour. The initiation step was then repeated by adding another portion of 2,2'-azobis[2-(2-imidazolin-2-yl)propane]dihydrochloride (1.4 g in 5 ml of water). The obtained reaction mixture was stirred at 45° C. for another hour. Finally, the resulting polymer solution was cooled to room temperature and the reactor was emptied. Table 1 shows acrylamide-based polymers prepared using different amounts of monomers having the following designations:

AcAm: Acrylamide
DMAEA-MCQ: Dimethylaminoethyl acrylate methyl chloride quaternary salt
AAEMA: Acetoacetoxyethyl methacrylate

TABLE 1

| Polymer | AcAm (g) | AcAm (mole %) | DMAEA-MCQ (g) | DMAEA-MCQ (mole %) | AAEMA (g) | AAEMA (mole %) |
|---|---|---|---|---|---|---|
| Ref. 1 | 95.0 | 100.0 | — | — | — | — |
| Ref. 2 | 87.0 | 95.0 | 7.8 | 5.0 | — | — |
| P1 | 80.3 | 92.5 | 3.7 | 2.5 | 6.9 | 5.0 |
| P2 | 80.3 | 90.0 | 7.6 | 5.0 | 7.1 | 5.0 |
| P3 | 70.0 | 85.0 | 14.0 | 10.0 | 6.5 | 5.0 |
| P4 | 80.0 | 92.5 | 7.4 | 5.0 | 3.4 | 2.5 |
| P5 | 80.3 | 90.0 | 7.6 | 5.0 | 7.1 | 5.0 |
| P6 | 70.0 | 85.0 | 7.0 | 5.0 | 13.1 | 10.0 |
| P7 | 80.3 | 90.0 | 7.6 | 5.0 | 7.1 | 5.0 |
| P8 | 60.0 | 80.0 | 12.8 | 10.0 | 11.9 | 10.0 |

Notes:
The amount of sodium formate was 3.5 g in the process of preparing P5, and 5.0 g in the process of preparing Ref. 2 and P7.

In Table 1, polymers P1-P8 of are in accordance with the present invention.

Example 2

This Example describes further polymers which were used for comparison. The polymers were either cationic starches available on the market or cationic polyacrylamides prepared according to the general procedure of Example 1 using different amounts of acrylamide and cationic monomer:
Ref. 3: Solbond PC 40 from Solam, Germany, a cationic starch with DS=0.04
Ref. 4: Solbond PC 50 from Solam, Germany, a cationic starch with DS=0.05
Ref. 5: Cationic polyacrylamide, 35 mole % cationic charge
Ref. 6: Cationic polyacrylamide, 10 mole % cationic charge
Ref. 7: Cationic polyacrylamide, 13 mole % cationic charge
Ref. 8: Cationic polyacrylamide, 3 mole % cationic charge Example 3

This Example describes the production of paper and board in which polymers according to Examples 1 and 2 were used as additives.

Sheets of paper or board with a grammage of approximately 115 g/m$^2$ were made using a dynamic sheet former (A.D.F supplied by Techpap SAS, France). The pulp used consisted of 100% HT-CTMP Star 700/77 (supplied by SCA, Sweden). Pulp suspensions at a consistency of 0.5% and conductivity 1.0 mS/cm at pH 7 were formed in a mixing chest and a polymer according to Example 1 or 2 was added to the suspension in an amount of 2.0 kg/t, 5.0 kg/t, or 10.0 kg/t, based on dry suspension, whereupon the suspension was mixed for 30 seconds, and the obtained suspension was pumped from the mixing chest through a traversing nozzle on a wire positioned on a rotating drum of the dynamic sheet former where it was dewatered for 90 seconds for sheet formation.

The obtained sheets of paper or board were pressed in a plane press at 5 bar for 5 minutes and thereafter dried restrained in a plane drier at 115° C. for 9 minutes. The sheets were conditioned in a climate room according to ISO 187:1990 and thereafter evaluated and analyzed in terms of grammage according to ISO 536:1995, tensile strength and tensile strength index (Nm/g) according to ISO 1924-3:2005 using an L&W Tensile tester of Lorenzen & Wettre, Sweden. GSM means grammage, MD means Machine Direction, and CD means Cross Direction. Improvement [%] means the Improvement in Tensile Strength Index (TSI) when a polymer was used in the process compared when using no polymer. The results are shown in Table 2.

TABLE 2

| Sheet No. | Polymer | Dosage [kg/ton] | GSM [g/m$^2$] | Tensile Strength MD [kN/m] | Tensile Strength CD [kN/m] | Tensile Strength Index [Nm/g] | Improvement TSI [%] |
|---|---|---|---|---|---|---|---|
| 1 | — | — | 110 | 5.79 | 0.90 | 20.8 | — |
| 2 | Ref. 2 | 2 | 113 | 6.00 | 0.96 | 21.3 | 2.4 |
| 3 | Ref. 2 | 5 | 112 | 6.31 | 1.14 | 24.0 | 15.4 |
| 4 | Ref. 2 | 10 | 114 | 7.88 | 1.29 | 28.0 | 34.6 |
| 5 | Ref. 3 | 2 | 117 | 6.48 | 1.20 | 23.9 | 14.9 |
| 6 | Ref. 3 | 5 | 115 | 6.94 | 1.28 | 25.9 | 24.5 |
| 7 | Ref. 3 | 10 | 115 | 7.50 | 1.38 | 28.0 | 34.6 |
| 8 | P1 | 2 | 114 | 7.53 | 1.42 | 28.7 | 38.0 |
| 9 | P1 | 5 | 113 | 8.82 | 1.55 | 32.6 | 56.7 |
| 10 | P1 | 10 | 115 | 8.90 | 1.89 | 35.7 | 71.6 |
| 11 | P2 | 2 | 115 | 8.15 | 1.42 | 29.6 | 42.3 |
| 12 | P2 | 5 | 114 | 9.14 | 1.84 | 36.0 | 73.1 |
| 13 | P2 | 10 | 116 | 9.85 | 2.00 | 38.1 | 83.2 |
| 14 | P3 | 2 | 116 | 8.18 | 1.42 | 29.3 | 40.9 |
| 15 | P3 | 5 | 119 | 8.90 | 1.85 | 34.2 | 64.4 |
| 16 | P3 | 10 | 118 | 9.17 | 1.92 | 35.6 | 71.2 |

Table 2 shows that significant improvements in strength properties were obtained according to the present invention using polymers P1 to P3.

Example 4

The procedure of Example 3 was repeated except that different polymers according to Examples 1 and 2 were used as additives. The results are set forth in Table 3.

TABLE 3

| Sheet No. | Polymer | Dosage [kg/ton] | GSM [g/m$^2$] | Tensile Strength MD [kN/m] | Tensile Strength CD [kN/m] | Tensile Strength Index [Nm/g] | Improvement TSI [%] |
|---|---|---|---|---|---|---|---|
| 17 | — | — | 110.4 | 5.9 | 1.13 | 7.8 | — |
| 18 | Ref. 4 | 2 | 114.9 | 6.9 | 1.31 | 8.9 | 14.1 |
| 19 | Ref. 4 | 5 | 114.2 | 7.69 | 1.45 | 9.9 | 26.9 |
| 20 | Ref. 4 | 10 | 114.9 | 8.23 | 1.67 | 10.9 | 39.7 |
| 21 | Ref. 5 | 2 | 118.5 | 8.28 | 1.79 | 11.2 | 43.6 |
| 22 | Ref. 5 | 5 | 117.3 | 8.02 | 1.65 | 10.6 | 35.9 |
| 23 | Ref. 5 | 10 | 117.1 | 7.84 | 1.65 | 10.5 | 34.6 |
| 24 | Ref. 6 | 2 | 119.4 | 7.87 | 1.50 | 9.9 | 26.9 |
| 25 | Ref. 6 | 5 | 118.4 | 8.56 | 1.59 | 10.7 | 37.2 |
| 26 | Ref. 6 | 10 | 120.8 | 9.04 | 1.76 | 11.5 | 47.4 |
| 27 | Ref. 7 | 2 | 116.3 | 7.48 | 1.40 | 9.5 | 21.8 |
| 28 | Ref. 7 | 5 | 117.4 | 8.13 | 1.44 | 10.0 | 28.2 |
| 29 | Ref. 7 | 10 | 115.8 | 9.01 | 1.59 | 11.1 | 42.3 |
| 30 | Ref. 8 | 2 | 117.8 | 7.99 | 1.66 | 10.6 | 35.9 |
| 31 | Ref. 8 | 5 | 121.1 | 10.13 | 1.74 | 12.1 | 55.1 |
| 32 | Ref. 8 | 10 | 119.4 | 10.97 | 1.92 | 13.3 | 70.5 |
| 33 | P2 | 2 | 120.4 | 9.19 | 1.66 | 11.3 | 44.9 |
| 34 | P2 | 5 | 123.2 | 11.25 | 2.01 | 13.5 | 73.1 |
| 35 | P2 | 10 | 121.8 | 11.52 | 2.28 | 14.7 | 88.5 |
| 36 | P4 | 2 | 121.3 | 8.42 | 1.62 | 10.6 | 35.9 |
| 37 | P4 | 5 | 123.0 | 10.21 | 1.93 | 12.7 | 62.8 |
| 38 | P4 | 10 | 123.5 | 11.39 | 2.16 | 14.1 | 80.8 |
| 39 | P6 | 2 | 123.9 | 9.31 | 1.71 | 11.3 | 44.9 |
| 40 | P6 | 5 | 124.0 | 10.26 | 1.92 | 12.6 | 61.5 |
| 41 | P6 | 10 | 121.7 | 10.82 | 2.20 | 14.0 | 79.5 |

Table 3 shows that significant improvements in tensile strength and tensile strength index results were obtained according to the present invention by means of polymers P2, P4 and P6.

Example 5

The procedure of Example 3 was repeated except that different polymers according to Examples 1 and 2 were used as additives and a different procedure was used for preparing the sheets of paper and board.

Sheets of paper or board with a grammage of approximately 110 g/m$^2$ were made using a dynamic sheet former (Formette Dynamic, supplied by Fibertech AB, Sweden). The pulp used was prepared from recycled solid board made from mixed waste paper qualities and to the pulp suspension was added CaCl$_2$ and Na$_2$SO$_4$ to increase the conductivity.

Pulp suspensions at a consistency of 0.5 weight % and conductivity of 4.9 mS/cm at pH 7.8 were formed in a mixing chest and a polymer according to Example 1 or 2 was added to the suspension in an amount of 2.0 kg/t, 5.0 kg/t, or 10.0 kg/t, based on dry suspension, whereupon the suspension was mixed for 30 seconds, and the obtained suspension was pumped from the mixing chest through a traversing nozzle on a wire positioned on a rotating drum of the dynamic sheet former where it was dewatered for 90 seconds for sheet formation. The obtained sheets of paper or board handled and analyzed as described in Example 3. The results are shown in Table 4.

TABLE 4

| Sheet No. | Polymer | Dosage [kg/ton] | GSM [g/m$^2$] | Tensile Strength MD [kN/m] | Tensile Strength CD [kN/m] | Tensile Strength Index [Nm/g] | Improvement TSI [%] |
|---|---|---|---|---|---|---|---|
| 42 | — | — | 104.1 | 5.07 | 1.59 | 27.3 | — |
| 43 | Ref. 4 | 2 | 111.5 | 6.36 | 1.75 | 29.9 | 9.5 |
| 44 | Ref. 4 | 5 | 110.9 | 6.65 | 1.82 | 31.4 | 15.0 |
| 45 | Ref. 4 | 10 | 115.0 | 7.16 | 2.07 | 33.5 | 22.7 |
| 46 | Ref. 8 | 2 | 108.7 | 5.82 | 1.75 | 29.4 | 7.7 |
| 47 | Ref. 8 | 5 | 106.3 | 6.36 | 1.78 | 31.7 | 16.1 |

TABLE 4-continued

| Sheet No. | Polymer | Dosage [kg/ton] | GSM [g/m²] | Tensile Strength MD [kN/m] | Tensile Strength CD [kN/m] | Tensile Strength Index [Nm/g] | Improvement TSI [%] |
|---|---|---|---|---|---|---|---|
| 48 | Ref. 8 | 10 | 112.8 | 6.67 | 1.86 | 31.2 | 14.3 |
| 49 | P2 | 2 | 110.5 | 6.41 | 1.85 | 31.2 | 14.3 |
| 50 | P2 | 5 | 108.4 | 6.81 | 1.92 | 33.4 | 22.3 |
| 51 | P2 | 10 | 110.6 | 7.62 | 2.03 | 35.6 | 30.4 |

Table 4 shows that considerable improvements in dry strength were obtained according to the present invention using polymer P2.

The invention claimed is:

1. A water-soluble cationic acrylamide-based polymer having one or more acetoacetate groups, the polymer being a linear polymer or a cross-linked polymer with 0.01 to 0.5 mole % cross-linked by a cross-linker monomer.

2. The water-soluble polymer according to claim 1, wherein the polymer has pendant acetoacetate groups.

3. The water-soluble polymer according to claim 1, wherein the polymer is obtained by polymerizing ethylenically unsaturated monomers comprising a monomer selected from the group consisting of (meth)acrylamides having one or more acetoacetate groups, (meth)acrylates having one or more acetoacetate groups, and mixtures thereof.

4. The water-soluble polymer according to claim 1, wherein the polymer is obtained by polymerizing ethylenically unsaturated monomers comprising 2-(acryloyloxy)ethylacetoacetate, 2-(methacryloyloxy)ethyl acetoacetate or a mixture thereof.

5. The water-soluble polymer according to claim 1, wherein the polymer is obtained by polymerizing ethylenically unsaturated monomers in an aqueous phase, wherein the monomers comprise:
a) (meth)acrylamide,
b) ethylenically unsaturated cationic monomer,
c) ethylenically unsaturated monomer having one or more acetoacetate groups, and
d) optionally other ethylenically unsaturated monomer.

6. The water-soluble polymer according to claim 1, wherein the polymer is obtained by polymerizing:
a) from 40 to 99 mole % of (meth)acrylamide,
b) from 0.5 to 20 mole % of cationic monomer,
c) from 0.5 to 20 mole % of monomer having one or more acetoacetate groups, and
d) from 0 to 20 mole % of other monomer.

7. The water-soluble polymer according to claim 1, wherein the polymer is obtained by polymerizing:
a) from 70 to 98 mole % of (meth)acrylamide,
b) from 1 to 10 mole % of cationic monomer,
c) from 1 to 10 mole % of monomer having one or more acetoacetate groups, and
d) from 0 to 10 mole % of other monomer.

8. The water-soluble polymer according to claim 1, wherein the polymer is obtained by polymerizing:
a) from at least 80 mole % of (meth)acrylamide,
b) from at least 2 mole % of cationic monomer, and
c) from at least 2 mole % of monomer having one or more acetoacetate groups.

9. The water-soluble polymer according to claim 1, wherein the polymer is obtained by polymerizing ethylenically unsaturated monomers comprising acrylamide.

10. The water-soluble polymer according to claim 1, wherein the polymer is obtained by polymerizing ethylenically unsaturated monomers comprising one or more cationic monomers selected from the group consisting of dimethylaminoethyl acrylate methyl chloride quaternary salt (DMAEAMCQ) or acryloxyethyl trimethylammonium chloride, dimethylaminoethyl acrylate methyl sulfate quaternary salt (DMAEA-MSQ), dimethylaminoethyl acrylate benzyl chloride quaternary salt (DMAEABCQ), dimethylaminoethyl methacrylate methyl chloride quaternary salt (DMAEMA-MCQ), dimethylaminoethyl methacrylate methyl sulfate quaternary salt (DMAEMA-MSQ), dimethylaminoethyl methacrylate benzyl chloride quaternary salt (DMAEMA-BCQ), acrylamidopropyltrimethylammonium chloride, dimethylaminopropyl acrylamide methyl chloride quaternary salt, dimethylaminopropyl acrylamide methyl sulfate quaternary salt, methacrylamidopropyltrimethylammonium chloride, dimethylaminopropyl methacrylamide methyl sulfate quaternary salt, diallyldietyhylammonium chloride (DADEAC) and diallyldimethylammonium chloride (DADMAC) and mixtures thereof.

11. The water-soluble polymer according to claim 1, wherein the polymer is obtained by polymerizing ethylenically unsaturated monomers comprising one or more other monomers.

12. The water-soluble polymer according to claim 1, wherein the polymer is obtained by polymerizing ethylenically unsaturated monomers comprising one or more other monomers selected from the group consisting of N,N-dimethylacrylamide, N,N-diethylacrylamide, N-isopropylacrylamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, N-vinylformamide, N-vinylacetamide, ethyltriglycol (meth)acrylate and butyldiglycol (meth)acrylate, N,N-methylenebisacrylamide, N,N-metylenebismethacrylamide, triallylamine, triallyl ammonium salts, ethylene glycol dimethacrylate, diethylene glycol dimethacrylate, polyethylene glycol diacrylate, polyethylene glycol dimethacrylate, N-vinyl acrylamide, N-methyl allylacrylamide, acrylic acid, methacrylic acid, fumaric acid, maleic acid, itaconic acid, acryloamidomethylbutanoic acid, 2-acrylamido-2-methylpropanesulfonic acid and salts thereof, sodium vinyl sulfonate, styrene sulfonate, allyl sulfonate, sodium vinyl sulfonate, vinylsulfonic acid and salts thereof, vinylphosphonic acid, allylphosphonic acid and salts thereof, sulfomethylated acrylamide and phosphomethylated acrylamide, and mixtures thereof.

13. The water-soluble polymer according to claim 5, wherein the polymer is obtained by polymerizing ethylenically unsaturated monomers comprising no other monomer.

14. A method for producing the water soluble polymer according to claim 1, said method comprising polymerizing ethylenically unsaturated monomers in an aqueous phase, wherein the monomers comprise:
a) (meth)acrylamide,
b) ethylenically unsaturated cationic monomer,
c) ethylenically unsaturated monomer having one or more acetoacetate groups, and
d) optionally other ethylenically unsaturated monomer.

15. A method to increase strength properties of paper and board, said method comprising a step of adding the water soluble polymer according to claim 1 as a strength agent in the production of paper and board.

16. A process for producing paper and board said process comprising the steps of:
  i) providing an aqueous cellulosic suspension,
  ii) adding to the suspension a water-soluble cationic acrylamide-based polymer having one or more acetoacetate groups, the polymer being a linear polymer or a cross-linked polymer with 0.01 to 0.5 mole % cross-linked by a crosslinker monomer, and
  iii) dewatering the suspension resulting from the step ii).

17. The process according to claim 16, wherein the suspension that is dewatered has a conductivity of at least 2.0 mS/cm.

18. The process according to claim 16, wherein the process further comprises recirculation of white water and introduction of less than 30 tons of fresh water per ton of dry paper and board produced.

19. The process according to claim 16, wherein the process further comprises adding to the suspension one or more drainage and retention aids.

20. Paper and board comprising a cationic water-soluble polymer according to claim 1.

\* \* \* \* \*